United States Patent
Carlisle

(10) Patent No.: US 12,462,112 B1
(45) Date of Patent: Nov. 4, 2025

(54) SYSTEMS AND METHODS FOR CREATING AND CONTINUOUSLY IMPROVING DOMAIN-SPECIFIC TRANSLATION MODELS USING SYNTHETIC DATA

(71) Applicant: SourceCAPs Holding, Inc., Birmingham, AL (US)

(72) Inventor: Ryan Carlisle, Granville, OH (US)

(73) Assignee: SourceCAPs Holding, Inc., Birmingham, AL (US)

( * ) Notice: Subject to any disclaimer, the term of this patent is extended or adjusted under 35 U.S.C. 154(b) by 0 days.

(21) Appl. No.: 19/187,502

(22) Filed: Apr. 23, 2025

Related U.S. Application Data

(63) Continuation of application No. 19/046,506, filed on Feb. 5, 2025.

(51) Int. Cl.
| | |
|---|---|
| G06F 40/58 | (2020.01) |
| G06F 40/30 | (2020.01) |
| G06F 40/42 | (2020.01) |
| G06N 3/0475 | (2023.01) |
| G06N 3/096 | (2023.01) |
| G06Q 10/10 | (2023.01) |

(52) U.S. Cl.
CPC ......... *G06F 40/42* (2020.01); *G06N 3/0475* (2023.01); *G06N 3/096* (2023.01); *G06Q 10/10* (2013.01)

(58) Field of Classification Search
CPC .... G06F 40/211; G06F 40/253; G06F 40/268; G06F 40/284; G06F 40/30; G06F 40/58
See application file for complete search history.

(56) References Cited

U.S. PATENT DOCUMENTS

| | | | | |
|---|---|---|---|---|
| 6,662,199 | B1* | 12/2003 | Flight | G06Q 10/06 707/999.1 |
| 8,850,321 | B2* | 9/2014 | Seeger | G06F 11/3055 709/224 |
| 10,824,675 | B2* | 11/2020 | Alonso | G06F 16/9024 |
| 11,928,526 | B1* | 3/2024 | Yastrum | G06F 9/542 |

(Continued)

OTHER PUBLICATIONS

Azeltov, Retrieval Augmented Fine Tuning: Use GPT-4o to fine tune GPT-4o mini for domain specific application, Microsoft AI—AI Platform Blog, Sep. 25, 2024, pp. 1-6, https://techcommunity.microsoft.com/blog/aiplatformblog/retrieval-augmented-fine-tuning-use-gpt-4o-to-fine-tune-gpt-4o-mini-for-domain-s/4248861.

*Primary Examiner* — Lamont M Spooner
(74) *Attorney, Agent, or Firm* — André J. Bahou; Bradley Arant Boult Cummings LLP

(57) ABSTRACT

Systems and methods are disclosed herein for creating and continuously improving domain-specific translation models using synthetic data. The systems and methods can include creating a domain-specific translation model for product naming conventions, training the domain-specific translation model, and translating an arbitrary product name to a standardized product descriptor using the trained domain-specific translation model. The system can include a canonical reference ontology (CRO) defining a canonical ontology for a given domain, a generative AI model for creating synthetic training data based on the CRO, and a domain-specific translation model. The methods can include training the domain-specific translation model with the synthetic training data to translate arbitrary product names to standardized product descriptors for the domain.

8 Claims, 5 Drawing Sheets

(56) References Cited

U.S. PATENT DOCUMENTS

| | | | | |
|---|---|---|---|---|
| 2003/0009322 | A1* | 1/2003 | Marcu | G06F 40/242 |
| | | | | 704/7 |
| 2004/0030551 | A1* | 2/2004 | Marcu | G06F 40/44 |
| | | | | 704/240 |
| 2008/0243889 | A1* | 10/2008 | Chen | G06F 16/355 |
| 2009/0063126 | A1* | 3/2009 | Itagaki | G06F 40/44 |
| | | | | 704/2 |
| 2014/0297252 | A1* | 10/2014 | Prasad | G10L 15/01 |
| | | | | 704/2 |
| 2015/0371632 | A1* | 12/2015 | Skobeltsyn | G10L 15/1815 |
| | | | | 704/251 |
| 2017/0018268 | A1* | 1/2017 | Quast | G10L 15/063 |
| 2017/0323016 | A1* | 11/2017 | Feng | G06N 20/00 |
| 2018/0039661 | A1* | 2/2018 | Kirshenbaum | G06F 16/2246 |
| 2018/0129972 | A1* | 5/2018 | Chen | G06N 3/045 |
| 2018/0225281 | A1* | 8/2018 | Song | G06N 5/02 |
| 2021/0303638 | A1* | 9/2021 | Zhong | G06F 40/169 |
| 2022/0058227 | A1* | 2/2022 | Balakrishnan | G06Q 30/0627 |
| 2022/0092096 | A1* | 3/2022 | Yuan | G06F 40/295 |
| 2023/0139339 | A1* | 5/2023 | Tate | G06Q 30/0204 |
| | | | | 705/7.33 |
| 2024/0071047 | A1* | 2/2024 | Kundu | G06V 30/42 |
| 2025/0148209 | A1* | 5/2025 | Jadhav | G06F 40/284 |

* cited by examiner

400

Receiving one or more of a plurality of synthetic input-output pairs or labeled real-world data comprising a plurality of standardized product descriptors — 402

Preparing the one or more of the plurality of synthetic input-output pairs or the labeled real-world data for training the domain-specific translation model — 404

Generating a plurality of mappings of proprietary descriptors to canonical references based on the one or more of the plurality of synthetic input-output pairs or the labeled real-world data — 406

FIGURE 4

SYSTEMS AND METHODS FOR CREATING AND CONTINUOUSLY IMPROVING DOMAIN-SPECIFIC TRANSLATION MODELS USING SYNTHETIC DATA

RELATED APPLICATIONS

This application is a continuation of U.S. patent application Ser. No. 19/046,506, entitled "Systems and Methods for Creating and Continuously Improving Domain-Specific Translation Models Using Synthetic Data," filed Feb. 5, 2025, which is pending, and which is incorporated by reference in its entirety.

TECHNICAL FIELD

The present disclosure generally relates to artificial intelligence based classification techniques, and more particularly to systems and methods for creating and continuously improving domain-specific translation models using synthetic data.

BACKGROUND

Many industries, especially those dealing in raw materials, commodities, or specialized components, lack standardized naming schemes for describing their products. Each entity (e.g., a supplier, vendor, distributor, or customer) maintains its own proprietary naming conventions instead of using a standardized naming scheme for the industry. As a result, data exchange, inventory reconciliation, and inter-company transactions often require extensive manual intervention. Conventional solutions attempt to either standardize all entities onto a single naming system or rely on extensive manual mapping efforts. Standardization can be costly and undesirable because companies often regard their proprietary naming conventions as strategically valuable. Manual mapping is labor-intensive, error-prone, and does not scale to large inventories or numerous participants. Current approaches in machine learning for performing such a mapping require large corpora of labeled examples (e.g., pairs of proprietary item names and their standardized references) for supervised learning methods of training a machine learning model to learn translations. However, in the early stages of building such a machine learning system, no labeled data may be available and producing such labeled data can be exceedingly time consuming. What is needed is a technique for generating initial training data to train machine learning models to translate data into a standardized naming scheme for the industry, and thus address the "cold start" problem of having no labeled training data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure generally relates to artificial intelligence based classification techniques, and more particularly to systems and methods for creating and continuously improving domain-specific translation models using synthetic data. The systems and methods of the present disclosure allow for establishing interoperability across disparate item naming conventions (e.g., across different domains) by using artificial intelligence (AI) to automatically generate synthetic training data specific to a domain based on canonical references for that domain. The synthetic training data can be used to train a domain-specific translation model. The domain-specific translation model can then receive an arbitrary input from a user (e.g., a proprietary item identifier based on a proprietary naming convention) and translate the arbitrary input into a standardized, canonical form. As a result, no labeled real-world data is needed to train the domain-specific translation model, but rather the AI-generated synthetic training data is used to train the domain-specific translation model instead.

A canonical reference ontology (CRO) comprising a structured, authoritative set of standardized item descriptors can serve as the "ground truth" or reference taxonomy for a given domain (e.g., metals, lumber, raw materials, etc.). The CRO may be any well-defined set of reference items, either newly devised or preexisting, that serves as an organized "ground truth" for the given domain. A generative AI component can produce synthetic training data that includes realistic proprietary-style item names for each canonical entry in the CRO. The synthetic training data can then serve as a substantial labeled training corpus for a domain-specific translation model for the given domain without requiring any initial real-world data labeling. The synthetic training data can also be used to fine-tune the domain-specific translation model. As a result, at runtime, the domain-specific translation model can receive an arbitrary, previously unseen proprietary item descriptor as an input, map the input to a canonical-like representation, and identify the closest corresponding standardized entry in the CRO. Further, a retrieval mechanism (e.g., a vector-based similarity search) and a final reasoning step can be employed by the domain-specific translation model to ensure that the selected standardized entry aligns precisely with the unique attributes of the input.

A continuous improvement cycle can be integrated into the system to improve the accuracy of the domain-specific translation model and expand the model's domain coverage with reduced manual effort. As new items are introduced into the CRO, additional synthetic data can be generated by the generative AI component for these new entries and the domain-specific translation model can be further fine-tuned on the additional synthetic data. Additionally, user feedback from real-world usage (e.g., corrections to suggested mappings) can be captured and periodically integrated back into this training pipeline.

The systems and methods of the present disclosure are broadly applicable across industries and domains, as any domain with a defined standardized taxonomy, such as metals, lumber, stone, plastics, raw materials, pharmaceuticals, chemicals and chemical compounds, agricultural products, construction materials, electronics and electrical components, industrial components, or any commoditized market, can adopt the systems and methods disclosed herein. The systems and methods for creating and continuously improving domain-specific translation models using the synthetic data of the present disclosure remove the initial data bottleneck, thereby enabling the rapid creation of a domain-specific translation model that is agnostic to proprietary naming schemes and facilitating seamless interoperability between disparate systems. For instance, the training data can be generated from a CRO without needing initial manual labeling, reducing the time to train the domain-specific translation model. Furthermore, by automating the generation of training data and the mapping process, manual mapping efforts and errors are significantly reduced. Additionally, continuous, data-scarce model training can be performed with minimal manual labeling, regardless of how the CRO itself is built or maintained. The system is also scalable and adaptable, as new items and user feedback are integrated into the system to allow the domain-specific translation model to remain current and continuously improve.

One aspect of the disclosure is a method. The method may include a method for creating a domain-specific translation model for product naming conventions. The method may include receiving, by a generative artificial intelligence (GAI) model, a plurality of standardized product descriptors from a canonical reference ontology (CRO). The method may include producing, by the GAI model, a plurality of plausible proprietary naming variants for each standardized product descriptor in the CRO. The method may include generating, by the GAI model, a plurality of synthetic input-output pairs based on the plurality of plausible proprietary naming variants. The method may include transmitting, by the GAI model, the plurality of synthetic input-output pairs to the domain-specific translation model to train the domain-specific translation model to translate arbitrary product names to standardized product descriptors.

Another aspect of the disclosure is another method. The method may include a method for training a domain-specific translation model for product naming conventions. The method may include receiving, by the domain-specific translation model, one or more of a plurality of synthetic input-output pairs or labeled real-world data comprising a plurality of standardized product descriptors. The method may include preparing, by the domain-specific translation model, the one or more of the plurality of synthetic input-output pairs or the labeled real-world data for training the domain-specific translation model. The method may include generating, by the domain-specific translation model, a plurality of mappings of proprietary descriptors to canonical references based on the one or more of the plurality of synthetic input-output pairs or the labeled real-world data.

Another aspect of the disclosure is another method. The method may include a method for translating an arbitrary product name to a standardized product descriptor. The method may include receiving, by a domain-specific translation model, an arbitrary product name. The method may include generating, by the domain-specific translation model, a plausible standardized product descriptor corresponding to the arbitrary product name. The method may include retrieving, by the domain-specific translation model, a plurality of candidate standardized product descriptors from data storage based on the plausible standardized product descriptor. The method may include selecting, by the domain-specific translation model, a candidate standardized product descriptor from the plurality of candidate standardized product descriptors.

Numerous other objects, advantages and features of the present disclosure will be readily apparent to those of skill in the art upon a review of the following drawings and description of various embodiments.

BRIEF DESCRIPTION OF THE DRAWINGS

The accompanying drawings, which are incorporated in and constitute a part of the specification, illustrate exemplary embodiments of the disclosure. Together with the description, they serve to explain the objects, advantages, and principles of the disclosure.

FIG. 4 is a flowchart diagram illustrating an example embodiment of a method of the present disclosure.

DETAILED DESCRIPTION

Reference will now be made in detail to exemplary embodiments of the disclosure, some aspects of which are illustrated in the accompanying drawings.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(n)" where n may include a number. Referring to one of the elements as "Element 102" refers to any single element of the Elements 102(1)-(n). Additionally, referring to different elements "First Elements 102(1)-(n)" and "Second Elements 104(1)-(n)" does not necessarily mean that there must be the same number of First Elements as Second Elements and is equivalent to "First Elements 102(1)-(n)" and "Second Elements (1)-(m)" where m is a number that may be the same or may be a different number than n.

The present disclosure generally relates to artificial intelligence based classification techniques, and more particularly to systems and methods for creating and continuously improving domain-specific translation models using synthetic data. The synthetic data can be generated by a generative AI model based on a canonical reference ontology that includes standardized item descriptors for a particular domain. A domain-specific translation model can be trained using the synthetic data to be able to translate an arbitrary item description into a standardized, canonical form. The domain-specific translation model can be continuously trained with additionally generated synthetic data and labeled training data based on the outputs of the model to improve the accuracy of the model. Any domain with a defined standardized taxonomy, such as metals, lumber, stone, plastics, raw materials, pharmaceuticals, chemicals and chemical compounds, agricultural products, construction materials, electronics and electrical components (e.g., semiconductors), industrial components, or any commoditized market, can adopt the systems and methods disclosed herein.

Figure 1:
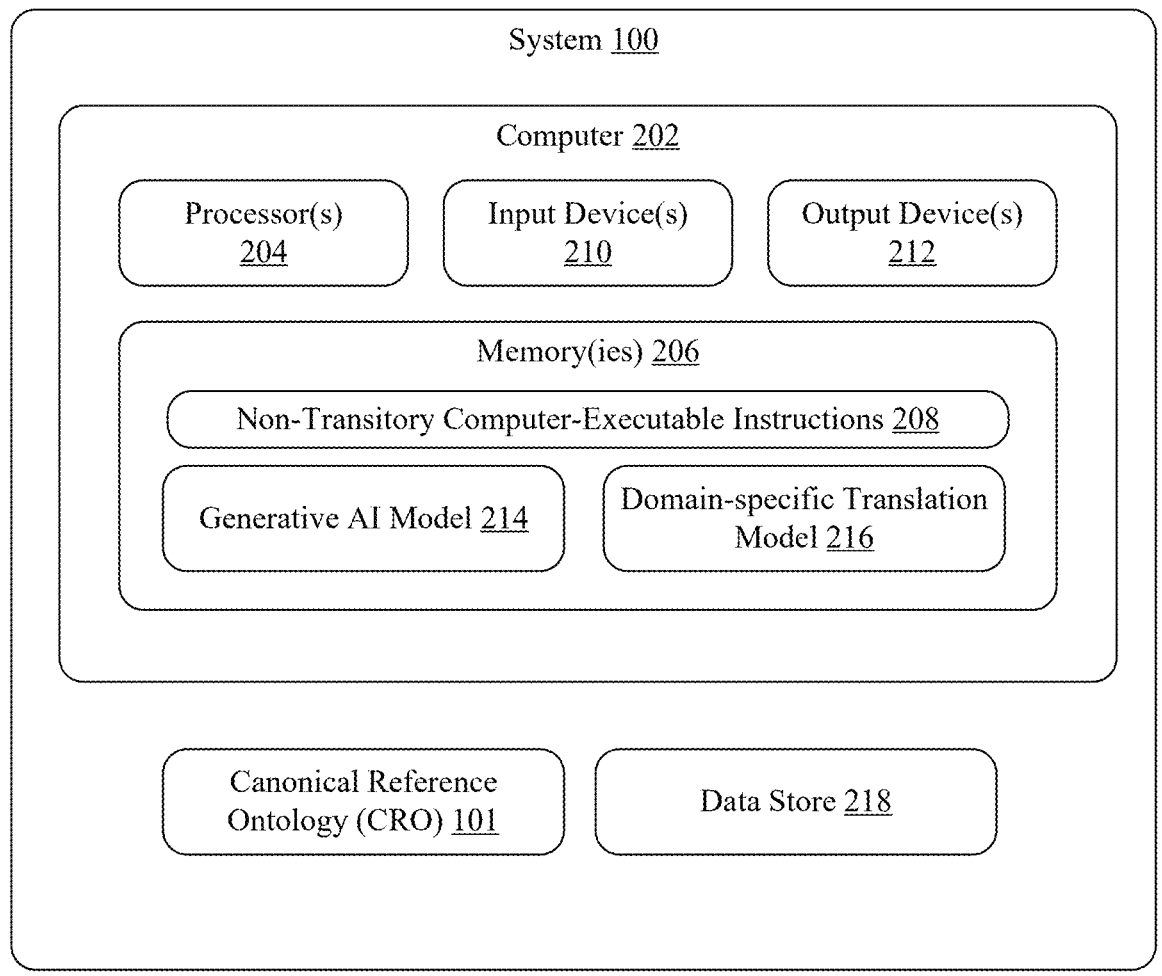
FIG. 1 is a block diagram illustrating an example embodiment of a system of the present disclosure.

FIG. 1 is a block diagram illustrating an example embodiment of a system 100 of the present disclosure. The system 100 can include a computing device 202 with at least one processor 204 and one or more memories 206. The memories 206 can store non-transitory computer-executable instructions 208. The computing device 202 can also comprise one or more input devices 210 and one or more output devices 212. The non-transitory computer-executable instructions 208, upon execution, can cause the computing device 202 to perform the methods for creating and continuously improving domain-specific translation models using synthetic data disclosed herein.

The system 100 can include a canonical reference ontology (CRO) 101. The CRO 101 may be a structured, authoritative taxonomy representing a domain's standardized items. For example, in the metals industry, the CRO 101 may specify a hierarchical nomenclature that captures material composition, form, dimensional attributes, and applicable standards, as non-limiting examples. In other example domains (e.g., the lumber industry, raw materials), the CRO may encode similar standard attributes relevant to that sector. Each entry in the CRO represents a stable "standard" that can serve as a universal reference point. Thus, the CRO 101 can be a source of a domain-specific set of standardized item descriptors that serve as a common reference point or organized "ground truth" for a given domain. The CRO 101 may comprise any type of data store, such as a database with records defining a canonical ontology for a given domain.

The system 100 can include a generative AI model 214 configured to produce synthetic proprietary-style naming variants for each canonical entry within the CRO 101. For example, the generative AI model 214 may be a large language model (LLM). The generative AI model 214 can be pre-trained on broad textual corpora and possibly domain-adjusted to produce multiple realistic variations of how various companies might name a single standardized entry in that domain. Prompting the generative AI model 214 with a canonical description from the CRO 101, along with domain-specific stylistic guidelines, can produce a set of proprietary-style item strings that plausibly reflect real-world naming diversity. The generative AI model 214 can be prompted with each of the canonical descriptions in the CRO 101 to generate a large synthetic dataset of input-output pairs, one pair for each of the canonical descriptions. In some embodiments, the generative AI model 214 can be a directed model with domain-specific prompts and heuristics to produce input-output pairs adapted to a domain with a well-defined standardized taxonomy. The input of an input-output pair can include a plausible, previously unseen proprietary-style name. The output of an input-output pair can include the known canonical reference from the CRO 101 for the input. As a result, a training set is generated without requiring human annotation of the data. Furthermore, any advanced or future technologies (e.g., specialized LLMs, custom trained models, custom indexes, or agent-based modeling, as non-limiting examples) may be substituted or combined to yield enhanced domain-relevant synthetic data results for improved modeling.

The system 100 can include a domain-specific translation model 216 trained on the synthetic dataset of input-output pairs created by the generative AI model 214 to translate arbitrary product names to standardized product descriptors (i.e., canonical descriptions). For example, the domain-specific translation model 216 may be a transformer-based model trained for text-to-text tasks. In some embodiments, the generative AI model 214 may send the synthetic dataset of input-output pairs to the domain-specific translation model 216 for training. The domain-specific translation model 216 can receive and prepare the synthetic dataset of input-output pairs, then generate mappings of proprietary descriptors to canonical references based on the synthetic dataset of input-output pairs. Fine-tuning the domain-specific translation model 216 allows the model to learn to "translate" arbitrary item strings into standardized forms (i.e., canonical descriptions). The output expected from the domain-specific translation model 216 at runtime includes a canonical reference (e.g., a standardized product descriptor), so the system 100 can use canonical references (e.g., standardized product descriptors) from the CRO 101 as inputs to the generative AI model 214 to produce plausible inputs (e.g., synthetic proprietary descriptors) for the domain-specific translation model 216—these input-output pairs can be used to train the domain-specific translation model 216 so it can learn to output a candidate canonical reference (e.g., a candidate standardized product descriptor) based on an arbitrary product descriptor input by a user or other system.

At runtime, a user can provide an arbitrary item descriptor (e.g., a supplier's custom naming string), and the domain-specific translation model 216 can produce a canonical-like normalized form. The normalized suggestion can then be used in a retrieval layer to query a vector-based index representing all entries in the CRO (e.g., a vector similarity search). In some examples, the arbitrary item descriptor can be a string parsed from a text file or other text data, such as an email with text describing products. This retrieval step can identify a small subset of candidate canonical matches for the arbitrary item descriptor input. To achieve a final, highly accurate determination, a reasoning layer can compare the candidate canonical matches against the arbitrary item descriptor input to refine and select the best canonical match. For example, an LLM can be invoked in a specialized prompt and perform vector-based index searches, as this is not restricted to any single retrieval engine. This reasoning step can therefore evaluate domain-specific attributes (e.g., dimensions, grades, classifications) to select the closest, most appropriate standardized entry. The result is a stable, canonical description corresponding to the user's arbitrary item descriptor input.

For example, in the metals industry, synthetic variants of standardized metal grades and dimensions can be generated by a generative AI model 214 to train a domain-specific translation model 216 that accurately identifies equivalents of proprietary naming strings from various suppliers. In another example, in the lumber industry, standardized lumber descriptions (e.g., in a CRO) can be coupled with variants generated by a generative AI model 214 to create a robust domain-specific translation model 216 that can interpret any mill's proprietary naming system and map it to a canonical, standardized lumber descriptor.

Because the domain-specific translation model 216 is trained on a diverse, artificially expanded set of naming variants (i.e., the synthetic dataset), the domain-specific translation model 216 can generalize to new proprietary naming conventions it encounters at runtime. Further, as new canonical entries are added to the CRO 101, the synthetic data generation by the generative AI model 214 and the fine-tuning of the domain-specific translation model 216 can be repeated periodically (e.g., on a scheduled basis) to produce new variants and feed them into the next training cycle, thereby ensuring that the domain-specific translation model 216 remains up-to-date and capable of handling newly introduced standardized items for the domain. For example, the generative AI model 214 can receive new canonical entries from the CRO 101 and generate a synthetic dataset of input-output pairs for the new canonical descriptions, which can be sent to the domain-specific translation model 216 for training. Additionally, a feedback mechanism can be employed where users can confirm or correct suggested matches. These user-generated labels can be incorporated into subsequent training cycles of the domain-specific translation model 216, gradually replacing reliance on purely synthetic data from the generative AI model 214 with increasingly accurate real-world examples to enhance the domain-specific translation model 216 precision and adaptability over time. For example, in some embodiments, the labeled real-world data can be received and prepared by the domain-specific translation model 216 to generate mappings of proprietary descriptors to canonical references based on the labeled real-world data, as a method to improve the domain-specific translation model 216. In some embodiments, a distillation process can be performed to reduce the size of the generative AI model 214 and/or the domain-specific translation model 216, and the smaller model(s) can be used in the system 100 for increased speed and reduced storage and memory space.

Figure 2:
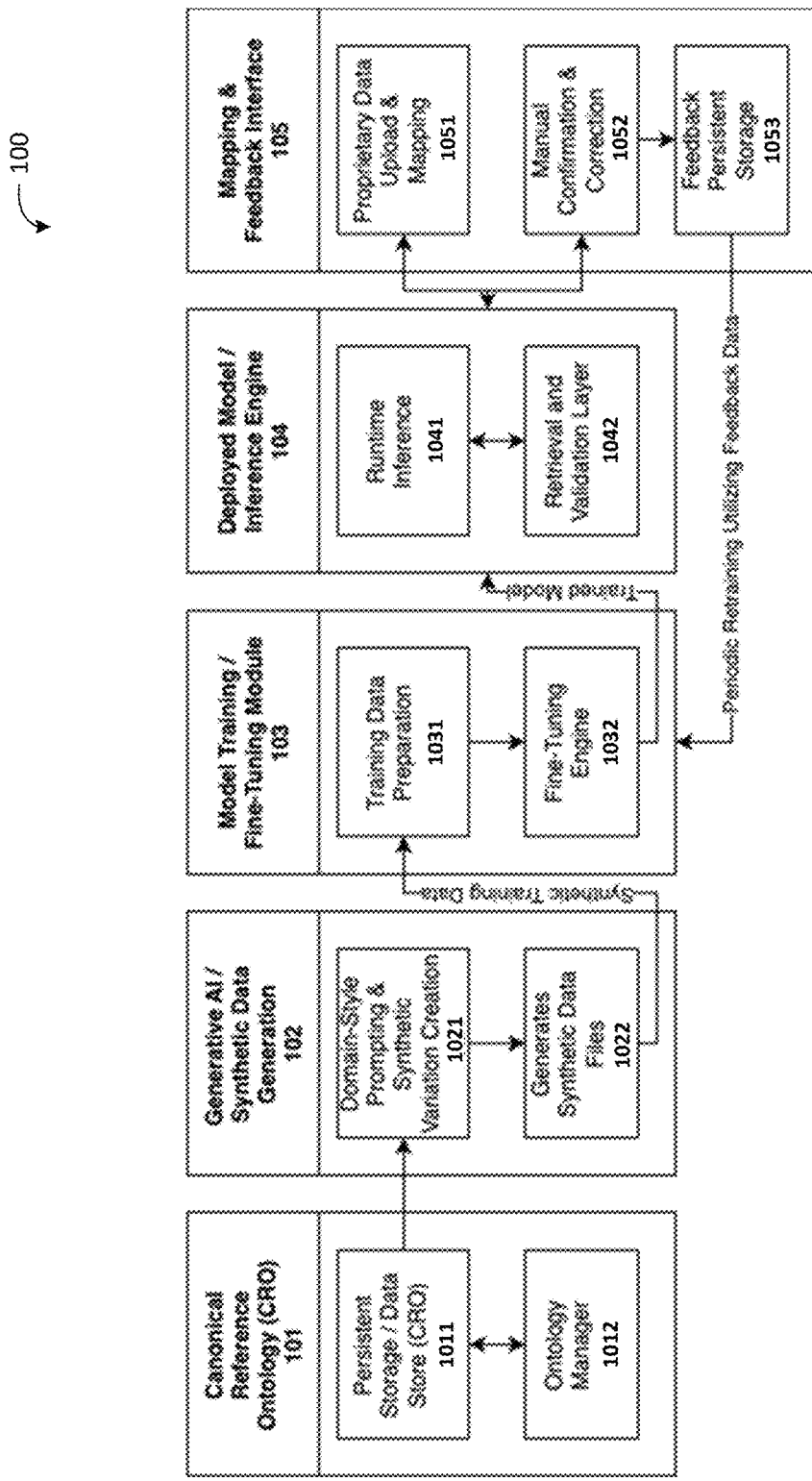
FIG. 2 is a schematic diagram illustrating an example embodiment of a system of the present disclosure.

FIG. 2 is a schematic diagram illustrating an example embodiment of the system 100 of the present disclosure. The schematic system architecture diagram of FIG. 2 illustrates a canonical reference ontology (CRO) 101 data store, a synthetic data generation module 102, a fine-tuned model training pipeline 103, a runtime inference engine and retrieval/indexing mechanism 104, and a feedback integration module 105. The synthetic data generation module 102 can be performed by the generative AI model 214. The fine-tuned model training pipeline 103 and the runtime inference engine and retrieval/indexing mechanism 104 can be performed by the domain-specific translation model 216. The series of labeled blocks (101, 102, 103, 104, 105) each comprise child blocks that collectively enable domain-specific translation of proprietary item descriptors via synthetic data generation and continuous feedback-based retraining.

The CRO 101 can include a persistent storage or data store 1011 and an ontology manager 1012. The persistent storage or data store 1011 can maintain the standardized descriptors or entries that define the canonical ontology for a given domain. In some embodiments, the persistent storage or data store 1011 may be implemented via relational databases, NoSQL solutions, or other persistent storage mechanisms capable of hosting the universal reference items. The ontology manager 1012 can oversee the creation, modification, and organization of canonical entries. The ontology manager 1012 can also add new standardized items, update existing descriptors, or remove deprecated entries in the CRO 1011. The ontology manager 1012 can interact with the persistent storage or data store 1011 to ensure that the canonical references remain accurate and reflective of the domain as it evolves over time.

The synthetic data generation module 102 can include domain-style prompting and synthetic variation creation 1021 and generating synthetic data files 1022. Domain-style prompting and synthetic variation creation 1021 can include the generative AI model 214 that, when prompted with standardized product descriptors from the CRO 101, can produce synthetic proprietary-style item names or variations as an output (i.e., a synthetic dataset). In some embodiments, domain-specific heuristics may be applied to simulate real-world linguistic patterns or naming conventions. Additionally, custom indexes, previously built models, or AI agents may be used in some embodiments to augment or refine the generative capabilities of the synthetic data generation module 102 and the generative AI model 214. As emerging AI technologies or model architectures become available, the synthetic data generation module 102 can incorporate these advancements to further improve the breadth or quality of the synthetic data generation.

Generating synthetic data files 1022 can include aggregating the output from the domain-style prompting and synthetic variation creation 1021 into structured data files. The structured data files can include input-output pairs, where the input in an input-output pair is a synthetic proprietary descriptor and the output in an input-output pair is the corresponding canonical reference. The structured data files may be files or other equivalent data artifacts and can be stored in a data store (e.g., a database), such as data store 218. The structured data files may form the backbone of the initial training data corpus (i.e., the synthetic dataset) for use in cold start scenarios where labeled real-world data is not available.

The synthetic training data (e.g., the structured data files containing input-output pairs) can be received by the domain-specific translation model 216 from the generative AI model 214. The fine-tuned model training pipeline 103 can include training data preparation 1031 and a fine-tuning engine 1032. Training data preparation 1031 can include integrating, formatting, and preparing data from multiple sources including the synthetic data generated by the synthetic data generation module 102 and any existing real-world labeled data, if available. Preparing the training data ensures consistent labeling formats, splits data for training and validation, and otherwise readies the dataset for model ingestion. The fine-tuning engine 1032 can receive the prepared training data and machine learning or deep learning techniques (e.g., transformer-based models) can be employed for the domains-specific translation model 216 to learn mappings from proprietary-style input strings to canonical references.

Over time, the fine-tuned model training pipeline 103 can be invoked additional times to incorporate newly generated synthetic data from the synthetic data generation module 102 and user feedback, thereby continuously refining the accuracy of the domain-specific translation model 216. Furthermore, as new canonical descriptions are added through the ontology manager 1012 to the CRO 1011, additional synthetic data can be automatically generated by the synthetic data generation module 102 for those newly introduced entries. The fine-tuning engine 1032 can then re-run the training cycle, thereby incorporating both real-world feedback and new synthetic data to maintain and improve the domain-specific translation model's 216 coverage and accuracy. When a satisfactory performance threshold is reached, a "Trained Model" artifact (i.e., the trained domain-specific translation model 216) is produced and deployed to an inference layer (the runtime inference engine and retrieval/indexing mechanism 104).

The runtime inference engine and retrieval/indexing mechanism 104 can include a runtime inference 1041 and a retrieval and validation layer 1042. The runtime inference 1041 can host the trained domain-specific translation model 216 for operational use. An input of an arbitrary proprietary descriptor can be transformed into a normalized or canonical-like representation by leveraging the most up-to-date fine-tuned domain-specific translation model 216 sent from the fine-tuning engine 1032. This deployed environment may comprise any system or orchestration of systems (e.g., Docker® containers, serverless frameworks, cloud-based compute clusters, as non-limiting examples) and is not restricted to a particular platform or technology stack.

The retrieval and validation layer 1042 can perform retrieval among canonical entries and conduct final validations to select the optimal standardized match after the runtime inference 1041. In some embodiments, a vector-based similarity search may be used as a retrieval and validation method, however other retrieval or matching methods (e.g., token-based matching, keyword search, or hybrid similarity approaches, as non-limiting examples) may be employed in other embodiments. As a result, the canonical reference that best aligns with the user's proprietary descriptor input is output by the domain-specific translation model 216. The validated match is then returned to the requesting interface (e.g., the computing device 202) and can be displayed, which enables seamless integration with existing workflows.

The feedback integration module 105 can include proprietary data upload and mapping 1051, manual confirmation and correction 1052, and feedback persistent storage 1053. Proprietary data upload and mapping 1051 can include receiving proprietary data in any format (e.g., CSV, XML, custom healthcare formats, or other proprietary standards) from users or external systems for canonical mapping. The received proprietary data may be proprietary descriptors and can be sent to the deployed domain-specific translation model 216 at the runtime inference engine and retrieval/indexing mechanism 104 for preliminary matches, regardless of the underlying data-loading mechanism. Manual confirmation and correction 1052 can include user confirmation or correction of the resulting output of the domain-specific translation model 216 upon receiving the domain-specific translation model's 216 suggested canonical reference output. Real-world validations that supersede synthetic assumptions can therefore be captured to produce highly accurate mappings over time. For instance, a one-to-one relationship between a specific company's proprietary identifier (e.g., "XYZ") and its canonical counterpart (e.g., "ZYX in the CRO") can be stored and maintained. As this repository of confirmed mappings grows, the system 100 can more effectively handle future items that share similar proprietary naming patterns. The feedback persistent storage 1053 may be a storage layer that aggregates all of these confirmed or corrected mappings to form an evolving repository of real-world labeled data. In some embodiments, the repository and/or storage layer may be included the data store 218. Periodically, this feedback can be transmitted back to the fine-tuned model training pipeline 103 to bolster and refine the domain-specific translation model's 216 training corpus in subsequent retraining cycles. Thus, as user corrections and new canonical entries accumulate, the system 100 can incorporate these updates into the training data preparation 1031 and re-apply the fine-tuning engine 1032. This cyclical approach ensures that the domain-specific translation model's 216 performance and domain coverage continually improves over time without requiring large-scale manual labeling efforts at the outset. In some embodiments, a distillation process can be performed to reduce the size of the generative AI model 214 and/or the domain-specific translation model 216, and the smaller model(s) can be used in the synthetic data generation module 102, the fine-tuned model training pipeline 103, and/or the runtime inference engine and retrieval/indexing mechanism 104.

Figure 3:
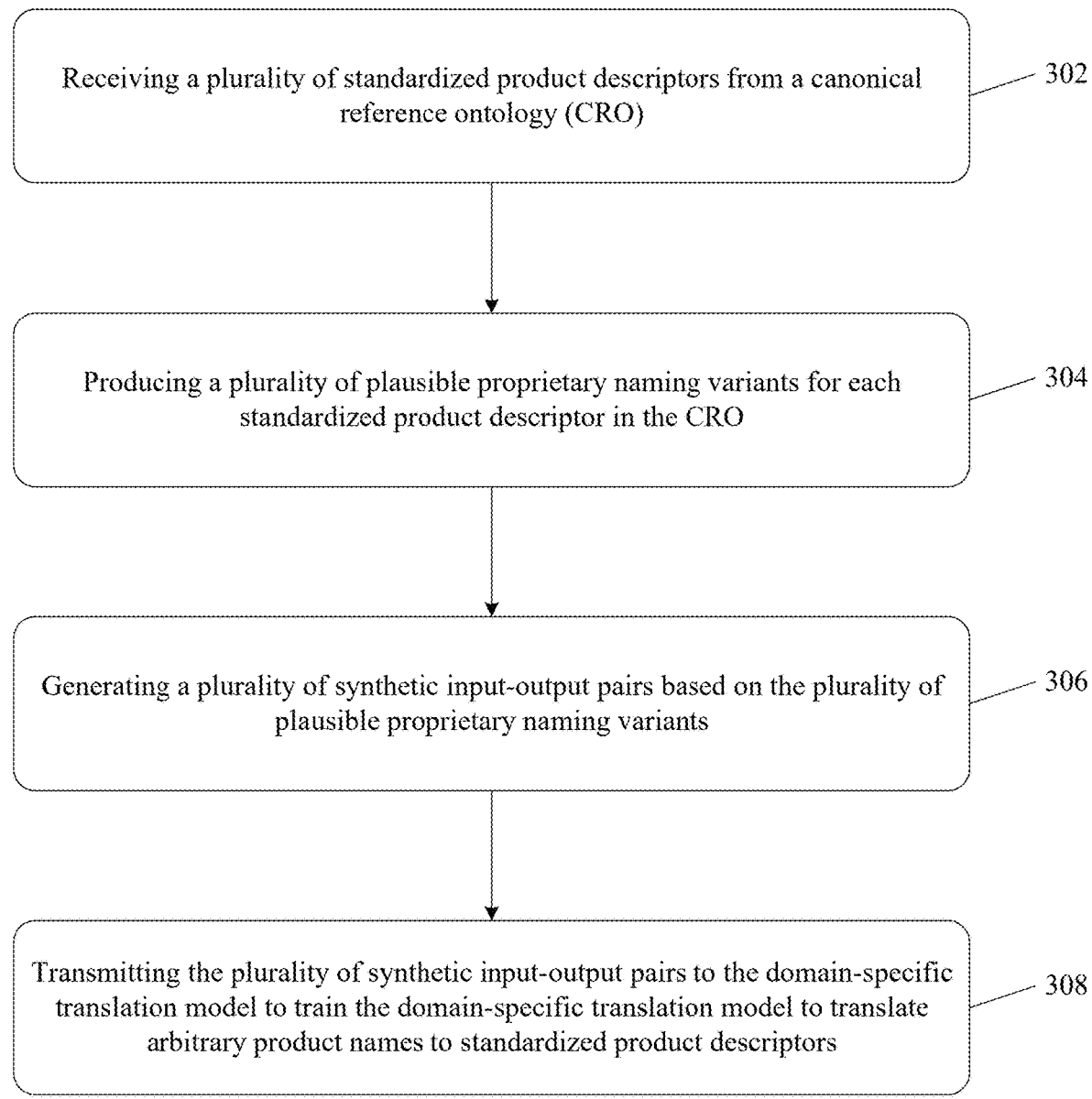
FIG. 3 is a flowchart diagram illustrating an example embodiment of a method of the present disclosure.

FIG. 3 is a flowchart diagram illustrating an example embodiment of a method 300 of the present disclosure. In certain embodiments, the method 300 for creating a domain-specific translation model for product naming conventions may include the step of providing one or more memories 206. The memories 206 may store non-transitory computer-executable instructions 208 for creating a domain-specific translation model for product naming conventions. The operations of the method 300 may be performed by a generative artificial intelligence (GAI) model. The method 300 may include operation 302 of receiving a plurality of standardized product descriptors from a canonical reference ontology (CRO). The method 300 may include operation 304 of producing a plurality of plausible proprietary naming variants for each standardized product descriptor in the CRO. The method 300 may include operation 306 of generating a plurality of synthetic input-output pairs based on the plurality of plausible proprietary naming variants. The method 300 may include operation 308 of transmitting the plurality of synthetic input-output pairs to the domain-specific translation model to train the domain-specific translation model to translate arbitrary product names to standardized product descriptors. The CRO may be a data store with a plurality of records defining a canonical ontology for a given domain. The CRO can be associated with a specified domain as a reference taxonomy for the specified domain. Each input in the plurality of synthetic input-output pairs may be a synthetic proprietary descriptor, and each output in the plurality of synthetic input-output pairs may be a canonical reference corresponding to an input of a synthetic input-output pair. The CRO and the plurality of synthetic input-output pairs may be adapted to a domain with a well-defined standardized taxonomy. In some embodiments, the GAI model may be a large language model (LLM). In some embodiments, generating the plurality of synthetic input-output pairs based on the plurality of plausible proprietary naming variants may include generating a plurality of data files comprising the plurality of synthetic input-output pairs. In some embodiments, generating the plurality of synthetic input-output pairs may include directing the GAI model with domain-specific prompts and heuristics. In some embodiments, the method 300 may further include determining that additional canonical references were added to the CRO, receiving an additional plurality of standardized product descriptors from the CRO, producing an additional plurality of plausible proprietary naming variants for each additional standardized product descriptor in the CRO, generating an additional plurality of synthetic input-output pairs based on the additional plurality of plausible proprietary naming variants, and transmitting the additional plurality of synthetic input-output pairs to the domain-specific translation model to train the domain-specific translation model to translate arbitrary product names to standardized product descriptors.

FIG. 4 is a flowchart diagram illustrating an example embodiment of a method 400 of the present disclosure. In certain embodiments, the method 400 for training a domain-specific translation model for product naming conventions may include the step of providing one or more memories 206. The memories 206 may store non-transitory computer-executable instructions 208 for training a domain-specific translation model for product naming conventions. The operations of the method 400 may be performed by the domain-specific translation model. The method 400 may include operation 402 of receiving one or more of a plurality of synthetic input-output pairs or labeled real-world data comprising a plurality of standardized product descriptors. The method 400 may include operation 404 of preparing the one or more of the plurality of synthetic input-output pairs or the labeled real-world data for training the domain-specific translation model. The method 400 may include operation 406 of generating a plurality of mappings of proprietary descriptors to canonical references based on the one or more of the plurality of synthetic input-output pairs or the labeled real-world data. In some embodiments, the method 400 may further include validating labels of the plurality of synthetic input-output pairs and the labeled real-world data and dividing the plurality of synthetic input-output pairs and the labeled real-world data into a first group for training the domain-specific translation model and a second group for validating the domain-specific translation model. In some embodiments, the method 400 may further include receiving a newly generated plurality of synthetic input-output pairs and user feedback on suggested mappings, preparing the newly generated plurality of synthetic input-output pairs and the user feedback for training the domain-specific translation model, and learning a plurality of mappings of proprietary descriptors to canonical references based on the newly generated plurality of synthetic input-output pairs and the user feedback.

Figure 5:
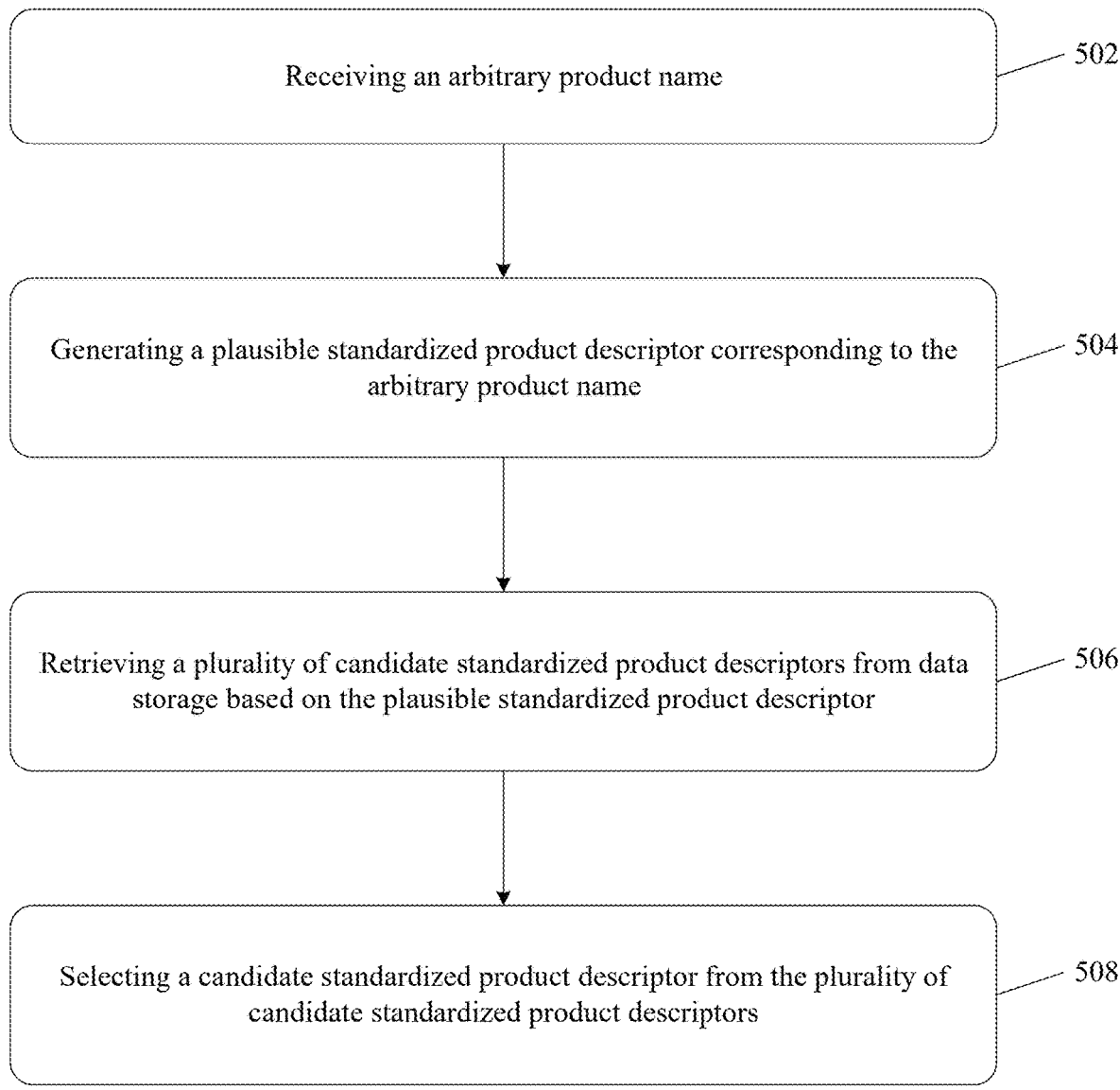
FIG. 5 is a flowchart diagram illustrating an example embodiment of a method of the present disclosure.

FIG. 5 is a flowchart diagram illustrating an example embodiment of a method 500 of the present disclosure. In certain embodiments, the method 500 for translating an arbitrary product name to a standardized product descriptor may include the step of providing one or more memories 206. The memories 206 may store non-transitory computer-executable instructions 208 for translating an arbitrary product name to a standardized product descriptor. The operations of the method 500 may be performed by a domain-specific translation model. The method 500 may include operation 502 of receiving an arbitrary product name. The method 500 may include operation 504 of generating a plausible standardized product descriptor corresponding to the arbitrary product name. The method 500 may include operation 506 of retrieving a plurality of candidate standardized product descriptors from data storage based on the plausible standardized product descriptor. The method 500 may include operation 508 of selecting a candidate standardized product descriptor from the plurality of candidate standardized product descriptors. The domain-specific translation model can be trained to translate arbitrary product names to standardized product descriptors based on a plurality of synthetic input-output pairs. In some embodiments, receiving the arbitrary product name may include receiving text data, parsing the text data, and retrieving the arbitrary product name from the parsed text data. In some embodiments, generating the plausible standardized product descriptor corresponding to the arbitrary product name may include receiving a plurality of data files comprising the plurality of synthetic input-output pairs and generating the plausible standardized product descriptor based on a plurality of plausible proprietary naming variants in the plurality of synthetic input-output pairs. In some embodiments, selecting the candidate standardized product descriptor from the plurality of candidate standardized product descriptors includes performing a vector-based search of the plurality of candidate standardized product descriptors, and performing the vector-based search includes comparing each candidate standardized product descriptor of the plurality of candidate standardized product descriptors against the arbitrary product name, where the plurality of candidate standardized product descriptors comprise entries in the CRO. In some embodiments, the method 500 may further include transmitting the candidate standardized product descriptor to a computing device to display the candidate standardized product descriptor. In some embodiments, the method 500 may further include receiving proprietary data for canonical mapping, receiving one or more corrected standardized product descriptors based on the candidate standardized product descriptor, mapping the proprietary data to the one or more corrected standardized product descriptors, and storing the mapping of the proprietary data to the one or more corrected standardized product descriptors in the CRO.

The presently disclosed systems and methods have a wide application anywhere in industry where standardized naming schemes for describing products is needed. One particularly important application for the systems and methods described herein relates to using a machine learning model to translate data comprising an arbitrary item name into a standardized naming scheme for a specific domain. Additional systems and methods include training a machine learning model with synthetic training data generated by an AI component rather than using labeled training data. However, the systems and methods described above could be utilized in other contexts.

As used herein, the term "computing device" may include a processor-controlled device, such as, by way of example, a personal computer, workstation, server, client, mini-computer, mainframe computer, desktop computer, laptop computer, smartphone, tablet, network of one or more individual computers, mobile computer, portable computer, handheld computer, or any combination thereof. The described systems and techniques may be performed by a system that includes a single computing device or more than one computing device.

A computing device may include an integrated circuit (IC) and may include an application-specific integrated circuit (ASIC) or some other type of IC. A computing device may be a uniprocessor or multiprocessor machine. Accordingly, a computing device may include one or more processors and, thus, the system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field-programmable gate arrays (FPGAs), programmable logic devices (PLDs), gated logic, and other suitable hardware configured to perform the various functionality described throughout this disclosure. In some embodiments, features of the system can be implemented primarily in hardware using, for example, hardware components such as application-specific integrated circuits (ASICs) or field-programmable gated arrays (FPGAs). Implementation of the hardware circuitry will be apparent to persons skilled in the relevant art(s). In yet another embodiment, features of the system can be implemented using a combination of both general-purpose hardware and software.

The computing device may include one or more memories. Accordingly, the system may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, videotapes, audio tapes, magnetic recording tracks, magnetic tunnel junction (MTJ) memory, optical memory storage, quantum mechanical storage, electronic networks, and/or other devices or technologies used to store electronic content such as programs and data. A basic input/output system (BIOS) can include basic routines that help to transfer information between elements within the system, such as during start-up, can be stored in the one or more memories.

The system can also include one or more storage devices. Examples of a storage device include, but are not limited to, a hard disk drive, a magnetic disk drive, an optical disc drive in combination with an optical medium, a solid-state memory device, or any combination thereof. A storage device can be connected to a bus by an appropriate interface, such as an SCSI, advanced technology attachment (ATA), serial ATA, universal serial bus (USB), IEEE 1394 (FIRE-WIRE), or any combination thereof. A storage device (or one or more components thereof) can be removably interfaced with the system (e.g., via an external port connector). The storage device and an associated computer-readable medium can provide nonvolatile and/or volatile storage of computer-executable instructions, data structures, program modules, and/or other data for the system.

In particular, the one or more memories may store computer-executable instructions that, when executed by the one or more processors, cause the one or more processors to implement the procedures and techniques described herein. The one or more processors may be operably associated with the one or more memories so that the computer-executable instructions can be provided to the one or more processors for execution. For example, the one or more processors may be operably associated to the one or more memories through one or more buses. Furthermore, the computing device may possess or may be operably associated with input devices (e.g., a keyboard, a keypad, controller, a mouse, a microphone, a touch screen, a sensor) and output devices such as (e.g., a computer screen, printer, or a speaker).

The computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++ or the like, and conventional procedural programming languages, such as the C programming language or similar programming languages. The computer readable program instructions may execute on a supercomputer, a compute cluster, or the like. The computer-executable instructions described herein can be downloaded to respective computing/processor devices from a computer-readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processor device receives computer readable program instructions from the network and forwards the computer readable program instructions for storage in a computer readable storage medium within the respective computing/processor device.

The computing device may execute an appropriate operating system such as LINUX®, UNIX®, MICROSOFT® WINDOWS®, APPLER MACOS®, IBM® OS/2®, ANDROID, and/or the like. The computing device may advantageously be equipped with a network communication device such as a network interface card, a modem, or other network connection device suitable for connecting to one or more networks.

A computing device may advantageously contain control logic, or program logic, or other substrate configuration representing data and instructions, which cause the computing device to operate in a specific and predefined manner as, described herein. In particular, the computing device programs, when executed, enable a control processor to perform and/or cause the performance of features or operations of the present disclosure. The control logic may advantageously be implemented as one or more modules. The modules may advantageously be configured to reside on the computing device memory and execute on the one or more processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and/or the like. The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells. The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent. In some embodiments, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having program code embodied thereon.

It should be understood that manipulations within the computing device are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computing device or computing devices.

It should also be understood that the programs, modules, processes, methods, and the like, described herein are but an exemplary implementation and are not related, or limited, to any particular computing device, apparatus, or computer language. Rather, various types of general-purpose computing machines or devices may be used with programs constructed in accordance with some of the teachings described herein. In some embodiments, very specific computing machines, with specific functionality, may be required. Similarly, it may prove advantageous to construct a specialized apparatus to perform the method steps described herein by way of dedicated systems with hard-wired logic or programs stored in nonvolatile memory, such as, by way of example, read-only memory (ROM).

The system may include one or more machine learning models, such as neural networks. The machine learning models may include supervised or unsupervised learning algorithms. For example, a neural network may include a deep neural network (DNN) (e.g., a deep auto-encoder neural network (deep ANN) or a convolutional neural network (CNN)) with an input layer, a plurality of hidden layers, and an output layer. Each layer may have one or more nodes where each node in a current layer is connected to every other node in a previous layer and a next layer (i.e., a fully-connected neural network), or not every node in each layer may be connected to every node in the previous and next layers. Each node in the input layer can be assigned a value and output that value to every node in the next layer (e.g., hidden layer). The nodes in the input layer can represent features about a particular environment or setting. Each node in the hidden layers can receive an outputted value from nodes in a previous layer (e.g., input layer) and associate each of the nodes in the previous layer with a weight. Each hidden node can then multiply each of the received values from the nodes in the previous layer with the weight associated with the nodes in the previous layer and output the sum of the products to each node in the next layer. Nodes in the output layer can handle input values received from the nodes in the hidden layer in a similar fashion. The output value of each output node can output information in a predefined format, where the information has some relationship to the corresponding information from the previous layer. Example outputs may include, but are not limited to, classifications, relationships, measurements, instructions, and recommendations. The output nodes can also be used to classify any of a wide variety of objects and other features and otherwise output any of a wide variety of desired information in desired formats.

Once a given network has been structured for a task, the neural network can be trained using a training dataset. A training system may use a training dataset to train the machine learning models to perform various functions based on input data to predict output data. Supervised learning uses a training dataset to teach models to yield the desired output. The training dataset can include inputs and desired outputs, which allow the model to learn over time. The network processes the inputs and compares the resulting outputs against a set of expected or desired outputs. Errors are then propagated back through the system. The training can adjust to change the weights that control the untrained neural network. The training process occur can repeatedly as the network weights are adjusted to refine the output generated by the neural network. The training process can continue until the neural network reaches a statistically desired accuracy associated with a trained neural network. The trained neural network can then be deployed to implement any number of machine learning operations to output a result. Unsupervised learning is a learning method in which the network uses algorithms to analyze and cluster unlabeled data to discover hidden patterns or data groupings. The training dataset includes input data without any associated output data. The untrained neural network can learn groupings within the unlabeled input and determine how individual inputs relate to the overall dataset. Unsupervised training can be used to for three main tasks-clustering, association, and dimensionality. Clustering is a data mining technique that groups unlabeled data based on similarities and differences, association is a rule-based method for finding relationships between variables in a given dataset, and dimensionality reduction is used when a given dataset's number of features (dimensions) is too high. Variations of supervised and unsupervised training may also be employed. Semi-supervised learning is a technique in which the training dataset includes a mix of labeled and unlabeled data of the same distribution. Incremental learning is a variant of supervised learning in which input data is continuously used to train the model further. Incremental learning enables the trained neural network to adapt to the new data without forgetting the knowledge instilled within the network during initial training.

A convolutional neural network (CNN) is a type of DNN having three additional features: local receptive fields, shared weights, and pooling. The input layer and output layer of a CNN function similar to the input and output layers of a DNN. The CNN is distinguished from a DNN in that the hidden layers of the DNN are replaced with one or more convolutional layers, pooling layers, and fully connected layers. The use of localized receptive fields involves having nodes in the convolutional layers to receive inputs from localized regions in the previous layer. The use of shared weights involves having each node in a convolutional layer assigning the same set of weights to the relative positions of a localized region. The input layer of the CNN can include data representing an image. The image can be passed through a convolutional hidden layer, an optional non-linear activation layer, a pooling hidden layer, and/or a fully connected hidden layers to get an output at the output layer. The convolutional hidden layer analyzes the image data of the input layer. Each node of the convolutional hidden layer is connected to a region of nodes (pixels) of the input image called a receptive field. The convolutional hidden layer can be considered as one or more filters (each filter corresponding to a different activation or feature map), with each convolutional iteration of a filter being a node or neuron of the convolutional hidden layer. The mapping from the input layer to the convolutional hidden layer is referred to as an activation map or feature map. The activation map includes a value for each node representing the filter results at each location of the input volume. The activation map can include an array containing the various total sum values resulting from each iteration of the filter on the input volume. The convolutional hidden layer can include several activation maps to identify multiple features in an image. A pooling hidden layer can be applied after the convolutional hidden layer and is used to simplify the information in the output from the convolutional hidden layer. The pooling hidden layer can take each activation map output from the convolutional hidden layer and generate a condensed activation map using a pooling function. The pooling function can be applied to each activation map in the convolutional hidden layer. The final layer of connections in the network is a fully connected layer that connects every node from the pooling hidden layer to every one of the output nodes in the output layer. The fully connected layer can obtain the output of the previous pooling layer, which should represent the activation maps of high-level features, and determine the features that most correlate to a particular class. For example, the fully connected layer can determine the high-level features that most strongly correlate to a particular class and can include weights (nodes) for the high-level features. A product can be computed between the weights of the fully connected layer and the pooling hidden layer to obtain probabilities for the different classes. For example, if the CNN is being used to predict that an object is a person, high values will be present in the activation maps that represent high-level features of people (e.g., two legs are present, a face is present at the top of the object, two eyes are present at the top left and top right of the face, a nose is present in the middle of the face, etc.).

Aspects of the present disclosure are described herein with reference to flowchart illustrations or block diagrams of methods, apparatuses, systems, or computer program products according to embodiments of the disclosure. It will be understood that each block of the flowchart illustrations and/or block diagrams, and combinations of blocks in the flowchart illustrations and/or block diagrams, can be implemented by computer-executable instructions. These computer-executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-executable instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

Those skilled in the art will recognize improvements and modifications to the preferred embodiments of the present disclosure. All such improvements and modifications are considered within the scope of the concepts disclosed herein and the claims that follow.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those skilled in the art will recognize, or be able to ascertain, using no more than routine experimentation, numerous equivalents to the specific substances and procedures described herein. Such equivalents are considered to be within the scope of this disclosure and are covered by the following exemplary claims.

Furthermore, the described features, structures, or characteristics of the disclosure may be combined in any suitable manner in one or more embodiments. In the description contained herein, numerous specific details are provided to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

What is claimed is:

1. A computer-implemented method for creating training data for a domain-specific translation model for product naming conventions, the computer-implemented method comprising:

receiving, by a generative artificial intelligence (GAI) model, a plurality of standardized product descriptors from a canonical reference ontology (CRO) associated with a specified domain;

producing, by the GAI model, a plurality of plausible proprietary product naming variants for each standardized product descriptor in the CRO;

generating, by the GAI model, a plurality of synthetic input-output pairs, each synthetic input-output pair comprising a plausible proprietary product naming variant from among the plurality of plausible proprietary product naming variants and a standardized product descriptor in the CRO that corresponds to the plausible proprietary product naming variant; and transmitting, by the GAI model, the plurality of synthetic input-output pairs to the domain-specific translation model as a training dataset to train the domain-specific translation model to translate unseen proprietary product names to the standardized product descriptors in the CRO, wherein the domain-specific translation model is associated with the specified domain while agnostic to proprietary product naming variants within the specified domain after training with the training dataset.

2. The computer-implemented method of claim 1, wherein generating the plurality of synthetic input-output pairs comprises generating a plurality of data files comprising the plurality of synthetic input-output pairs.

3. The computer-implemented method of claim 1, wherein the CRO comprises a data store with a plurality of records defining a canonical ontology for the specified domain.

4. The computer-implemented method of claim 1, wherein the plausible proprietary product naming variant of a synthetic input-output pair comprises a synthetic proprietary descriptor, and wherein the standardized product descriptor of a synthetic input-output pair comprises a canonical reference.

5. The computer-implemented method of claim 1, further comprising:
   determining that additional canonical references were added to the CRO;
   receiving an additional plurality of standardized product descriptors from the CRO, wherein the additional plurality of standardized product descriptors are associated with the additional canonical references;
   producing an additional plurality of plausible proprietary product naming variants for each additional standardized product descriptor in the CRO;
   generating an additional plurality of synthetic input-output pairs, each additional synthetic input-output pair comprising a plausible proprietary product naming variant from among the additional plurality of plausible proprietary product naming variants and a standardized product descriptor from among the additional plurality of standardized product descriptors in the CRO that corresponds to the plausible proprietary product naming variant; and
   transmitting the additional plurality of synthetic input-output pairs to the domain-specific translation model as a training dataset to train the domain-specific translation model to translate unseen proprietary product names to the additional standardized product descriptors in the CRO.

6. The computer-implemented method of claim 1, wherein generating the plurality of synthetic input-output pairs comprises directing the GAI model with domain-specific prompts and heuristics.

7. The computer-implemented method of claim 1, wherein the specified domain comprises raw materials, metals, lumber, stone, plastics, pharmaceuticals, chemicals, chemical compounds, agricultural products, construction materials, electronics, electrical components, industrial components, or any commoditized market.

8. The computer-implemented method of claim 1, wherein the unseen proprietary product names are based on a proprietary naming convention unknown to the domain-specific translation model.

\* \* \* \* \*